United States Patent
Spector et al.

(10) Patent No.: US 11,138,589 B2
(45) Date of Patent: Oct. 5, 2021

(54) SYSTEMS AND METHODS FOR SUPPORTING LEGACY AND TOKENIZED E-COMMERCE

(71) Applicant: JPMorgan Chase Bank, N.A., New York, NY (US)

(72) Inventors: Howard Spector, Woolwich, NJ (US); Allison Beer, Bronxville, NY (US); Christina Sheppard, Mamaroneck, NY (US); Scott H. Ouellette, Kingston, NH (US); Jason Carlyle, Chicago, IL (US); Tu P. Le, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 183 days.

(21) Appl. No.: 15/923,569

(22) Filed: Mar. 16, 2018

(65) Prior Publication Data

US 2018/0268399 A1    Sep. 20, 2018

Related U.S. Application Data

(60) Provisional application No. 62/472,174, filed on Mar. 16, 2017.

(51) Int. Cl.
*G06Q 20/36* (2012.01)
*G06Q 20/20* (2012.01)
(Continued)

(52) U.S. Cl.
CPC ............ *G06Q 20/36* (2013.01); *G06Q 20/20* (2013.01); *G06Q 20/202* (2013.01);
(Continued)

(58) Field of Classification Search
CPC .... G06Q 20/36; G06Q 20/227; G06Q 20/202; G06Q 20/385; G06Q 20/38215; G06Q 20/3224; G06Q 20/20
See application file for complete search history.

(56) References Cited

U.S. PATENT DOCUMENTS 9,852,410 B1 *  12/2017  Chen ................. G06Q 20/4012
2001/0027441 A1 * 10/2001  Wankmueller ....... G06Q 20/105
                                                                705/41
(Continued)

OTHER PUBLICATIONS

Alhothaily A., Alrawais A., Cheng X., Bie R. (2014) Towards More Secure Cardholder Verification in Payment Systems. In: Cai Z., Wang C., Cheng S., Wang H., Gao H. (eds) Wireless Algorithms, Systems, and Applications. WASA 2014. Lecture Notes in Computer Science, vol. 8491. Springer, Cham. (Year: 2014).*

(Continued)

*Primary Examiner* — Nathan A Mitchell
(74) *Attorney, Agent, or Firm* — Greenberg Traurig LLP

(57) ABSTRACT

System and methods for supporting legacy and tokenized transactions are disclosed. According to one embodiment, in an information processing device comprising at least one computer processor, a method for selecting an electronic payment credential to communicate to a merchant, may include (1) an electronic wallet backend receiving a plurality of payment credentials associated with a payment account; (2) the electronic wallet backend receiving a credential capability for a merchant; (3) the electronic wallet backend selecting one of the payment credentials for a transaction with the merchant based on the credential capability; and (4) the electronic wallet backend communicating the selected payment credential to a point of transaction device for the merchant.

16 Claims, 2 Drawing Sheets

(51) Int. Cl.
  *G06Q 20/22* (2012.01)
  *G06Q 20/38* (2012.01)
  *G06Q 20/32* (2012.01)

(52) U.S. Cl.
  CPC ....... *G06Q 20/227* (2013.01); *G06Q 20/3224* (2013.01); *G06Q 20/385* (2013.01); *G06Q 20/38215* (2013.01)

(56) References Cited

U.S. PATENT DOCUMENTS

| | | | |
|---|---|---|---|
| 2006/0165060 A1* | 7/2006 | Dua | G06Q 20/322 370/352 |
| 2007/0198410 A1* | 8/2007 | Labgold | G06Q 20/04 705/44 |
| 2010/0138347 A1* | 6/2010 | Chen | G06Q 20/385 705/44 |
| 2012/0028609 A1 | 2/2012 | Hruska | |
| 2012/0233005 A1* | 9/2012 | White | G06Q 20/382 705/18 |
| 2013/0275307 A1 | 10/2013 | Mohammad | |
| 2014/0040100 A1* | 2/2014 | Keitz | G06Q 20/12 705/37 |
| 2014/0278965 A1* | 9/2014 | Douglas | G06Q 20/227 705/14.51 |
| 2015/0186864 A1* | 7/2015 | Jones | G06Q 20/326 705/39 |
| 2016/0092878 A1* | 3/2016 | Radu | G06Q 20/4012 705/72 |
| 2016/0241402 A1* | 8/2016 | Gordon | H04L 9/3228 |
| 2016/0307184 A1* | 10/2016 | Peyton | G06Q 20/3255 |
| 2016/0307186 A1 | 10/2016 | Noe et al. | |
| 2017/0262849 A1 | 9/2017 | Hammad et al. | |
| 2017/0262850 A1 | 9/2017 | Hammad et al. | |
| 2017/0278096 A1* | 9/2017 | Chitalia | G06Q 20/40145 |
| 2018/0211022 A1* | 7/2018 | Wagner | G06F 21/34 |
| 2019/0354980 A1* | 11/2019 | Li | G06Q 20/36 |
| 2019/0362334 A1* | 11/2019 | Wang | G06Q 20/40 |
| 2020/0065806 A1* | 2/2020 | Wang | G06Q 20/3226 |
| 2020/0167775 A1* | 5/2020 | Reese | G06Q 20/4014 |

OTHER PUBLICATIONS

S. J. Murdoch, S. Drimer, R. Anderson and M. Bond, "Chip and PIN is Broken," 2010 IEEE Symposium on Security and Privacy, Berkeley/Oakland, CA, 2010, pp. 433-446, doi: 10.1109/SP.2010.33. (Year: 2010).*
U.S. Appl. No. 14/699,511, filed Apr. 2015, DeVan et al.
U.S. Appl. No. 15/069,458, filed Mar. 2016, Hammad et al.
U.S. Appl. No. 15/088,437, filed Apr. 2016, Hammad et al.
U.S. Appl. No. 15/131,979, filed Apr. 2016, Spector et al.
U.S. Appl. No. 15/158,720, filed May 2016, Spector.
U.S. Appl. No. 15/345,942, filed Nov. 2016, Sokol et al.
U.S. Appl. No. 15/612,167, filed Jun. 2017, Ouellette et al.
PCT International Search Report and Written Opinion, International Searching Authority, International Application No. PCT/US18/22876, dated Jun. 6, 2018, pp. 1-8.

* cited by examiner

SYSTEMS AND METHODS FOR SUPPORTING LEGACY AND TOKENIZED E-COMMERCE

RELATED APPLICATIONS

This application claims priority to U.S. Provisional Patent Application Ser. No. 62/472,174, filed Mar. 16, 2017, the disclosure of which is hereby incorporated, by reference, in its entirety.

BACKGROUND OF THE INVENTION

1. Field of the Invention

The present disclosure generally relates to systems and methods for supporting legacy and tokenized transactions.

2. Description of the Related Art

To conduct a transaction, e-commerce aggregating wallet providers need to provide credentials to their merchants. Most ecommerce aggregating wallets and most merchants, however, do not support card on file tokenization. This means that existing token infrastructures will not function.

SUMMARY OF THE INVENTION

System and methods for supporting legacy and tokenized transactions are disclosed. According to one embodiment, in an information processing device comprising at least one computer processor, a method for selecting an electronic payment credential to communicate to a merchant, may include (1) an electronic wallet backend receiving a plurality of payment credentials associated with a payment account; (2) the electronic wallet backend receiving a credential capability for a merchant; (3) the electronic wallet backend selecting one of the payment credentials for a transaction with the merchant based on the credential capability; and (4) the electronic wallet backend communicating the selected payment credential to a point of transaction device for the merchant.

In one embodiment, the electronic wallet backend may be an aggregating wallet backend.

In one embodiment, one of the plurality of payment credentials may be a single use account number for the payment account. The single use account number may be received from a financial institution associated with the payment account.

In one embodiment, one of the plurality of payment credentials may be a cryptogram for the payment account.

In one embodiment, the method may further include receiving a dynamic card validation value.

In one embodiment, the electronic wallet backend may receive the credential capability for the merchant based on a location of the information processing apparatus.

In one embodiment, the electronic wallet backend may receive the credential capability for the merchant from a database of merchant credential capabilities.

In one embodiment, the method may further include the electronic wallet backend receiving a selection of the payment account from a mobile payment computer application executed a mobile electronic device.

In one embodiment, the payment credential may be associated with at least one restriction.

In one embodiment, the electronic wallet backend may select at least a subset of the plurality of the payment credentials and communicates the subset of the plurality of the payment credentials to the merchant.

According to another embodiment, a method for selecting an electronic payment credential to communicate to a merchant may include: (1) a mobile electronic application for an aggregating wallet provider executed by a mobile electronic device initiating a transaction with a merchant; (2) the mobile electronic wallet application receiving an account selection from a mobile payment application executed by the mobile electronic device; (3) the mobile electronic wallet application for the aggregating wallet provider communicating a session id to an electronic wallet backend for the aggregating wallet provider; (4) the electronic wallet backend for the aggregating wallet provider receiving a plurality of payment credentials from a financial institution using the session id; (5) the electronic wallet backend for the aggregating wallet provider receiving a credential capability for the merchant; (6) the electronic wallet backend for the aggregating wallet provider selecting one of the payment credentials for the transaction with the merchant based on the credential capability; and (7) the electronic wallet backend for the aggregating wallet provider communicating the selected payment credential to a point of transaction device for the merchant.

In one embodiment, one of the plurality of payment credentials may be a single use account number for the payment account, and the electronic wallet backend for the aggregating wallet provider receives the single use account number from a financial institution associated with the payment account.

In one embodiment, one of the plurality of payment credentials may be a cryptogram for the payment account.

In one embodiment, the method may further include the electronic wallet backend for the aggregating wallet provider receiving a dynamic card validation value.

In one embodiment, the electronic wallet backend for the aggregating wallet provider may receive the credential capability for the merchant based on a location of the information processing apparatus.

In one embodiment, the method may further include the electronic wallet backend for the aggregating wallet provider receives the credential capability for the merchant from a database of merchant credential capabilities.

In one embodiment, the method may further include the electronic wallet backend for the aggregating wallet provider receiving a selection of the payment account from a mobile payment computer application executed a mobile electronic device.

In one embodiment, the payment credential may be associated with at least one restriction.

In one embodiment, the electronic wallet backend for the aggregating wallet provider may provide a plurality of the payment credentials to the merchant.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for supporting legacy and tokenized e-commerce are disclosed.

According to embodiments, ecommerce aggregating wallet providers may be provided with both tokenized and single use account (SUA) credentials, and may pass the appropriate credential(s), and other information, to the merchant in order to conduct the transaction. In one embodiment, the wallet provider may determine which credential(s) to provide to the merchant based on, for example, the wallet provider's relationship with the merchant, the type of payment the wallet provider knows that the merchant can process, etc. As the networks enable tokenized credentials to work fully with ecommerce merchants, issuers and wallet providers may migrate to tokenized credentials with minimal, if any, customer impact.

In another embodiment, the wallet provider may request a token or the SUA from the issuer based on the needs of the merchant.

In one embodiment, the wallet may provide one or more levels of credentials to the merchant's point of transaction (e.g., a point of sale device) to conduct a transaction. For example, in one embodiment, the wallet may provide the SUA to the merchant. In another embodiment, the wallet may provide a cryptogram to the merchant. In still another embodiment, the wallet may provide a cryptogram and additional information (e.g., a dynamic card validation value, or "dCVV"). In another embodiment, the wallet may provide the dCVV without the cryptogram. The wallet may select the credentials to provide the merchant based on, for example, the registered information for the merchant (e.g., what credentials the merchant is registered to accept), machine learning (e.g., past experience with the merchant), mobile device/merchant location (e.g., retrieving merchant credential capabilities based on the location of the user's mobile device), etc. Alternatively, the wallet may provide multiple credentials to the merchant, and the merchant (e.g., the merchant's point of transaction device) may decide which credential to use.

Figure 1:
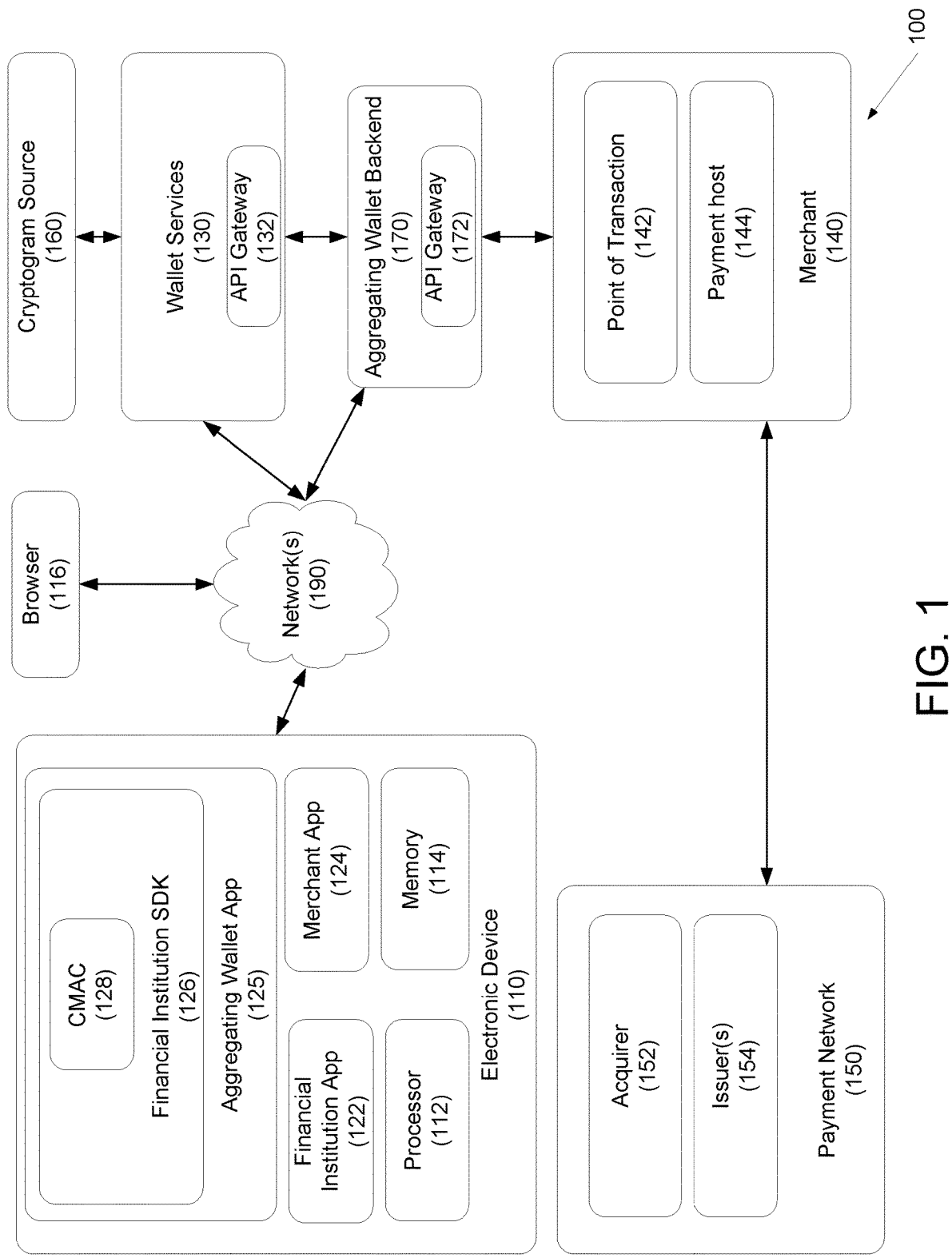
FIG. 1 depicts a system for supporting legacy and tokenized transactions according to one embodiment.

Referring to FIG. 1, a system for supporting legacy and tokenized e-commerce is disclosed according to one embodiment. System 100 may include consumer electronic device 110, which may be any suitable electronic device including one or more processor 112, memory 114, an input/output (not shown), and a network interface (not shown). Examples include smartphones, tablet computers, notebook computers, desktop computers, workstations, Internet of Things (IoT) appliances, etc.

Electronic device 110 may execute application ("app") or program 122 for a financial institution, or may access a financial institution website (e.g., a mobile website) via a mobile browser (not shown), etc. In one embodiment, financial institution app 122 may be a payment application (e.g., ChasePay).

Electronic device 110 may also execute aggregating wallet application 125, which may be, for example, a third party shopping app, a third party payment app, or any app in which a user may make a purchase. An example of aggregating wallet app is Facebook.

In one embodiment, aggregating wallet app 125 may be provided with software development kit (SDK) 126 for the financial institution. In one embodiment, an identifier, such as Consumer Merchant Authentication Code, or "CMAC" 128 may also be provided. CMAC 128 may be stored in one or more locations on electronic device 110. The location may depend on the manufacturer of electronic device 110, the operating system, etc. For example, CMAC 128 may be stored in a "key ring" or "key vault" on the device, in secure storage on electronic device 110 (e.g., the secure element on an iPhone), within aggregating wallet app 124, within SDK 126, etc. Other storage locations may be used as is necessary and/or desired.

In one embodiment, by storing CMAC 128 in a location other than aggregating wallet app 125 or SDK 126, aggregating wallet app 125 may be updated without requiring a new CMAC 128.

Exemplary implementations and uses of CMACs are disclosed in U.S. patent application Ser. No. 15/612,167 and 62/345,390. The disclosures of these documents are hereby incorporated by reference in their entireties.

Electronic device 110 may also execute merchant app 124, which may be provided for interaction with a merchant.

System 100 may further include browser 116. Browser 116 may be a full browser or a mobile browser, and may be executed by a mobile electronic device (e.g., smartphone, tablet computer, etc.), an Internet of Things appliance, a desktop computer, a notebook computer, etc. In one embodiment, a user may use browser 116 to interact with aggregating wallet backend 170 to identify a good or service for purchase.

In one embodiment, the user may authenticate within browser 116 using a lightbox, by entering credentials (e.g., username and password), biometrics, etc.

System 100 may further include wallet services 130. In one embodiment, wallet services may be provided by the financial institution that controls or manages the electronic wallet and/or payment application. Wallet services 130 may be provided with API gateway 132. In one embodiment, aggregating wallet backend 170 may code for API gateway 132.

System 100 may further include one or more payment network 150, which may include one or more acquirer 152 and one or more issuer 154.

System 100 may further include merchant 140, which may be a brick-and-mortar merchant, an on-line merchant, etc. In one embodiment, merchant 140 may include point of transaction terminal 142 (e.g., a point of sale terminal) and payment host 144. In one embodiment, payment host 144 may comprise the main server that all point of transaction terminals for a merchant to connect with. In one embodiment, this may consolidate all payment processing for acquirer 152.

Aggregating wallet backend 170 may be the backend or host for aggregating wallet app 125. In one embodiment, aggregating wallet backend 170 may communicate directly with merchant 140 and/or wallet services 130. Aggregating wallet backend 170 may include API gateway 172, which a merchant may code to.

In one embodiment, electronic device 110, wallet services 130, one or more payment network 150, browser 116, and aggregating wallet backend 170 may communicate over one or more communication network(s) 190. Communication networks 190 may include any suitable communication network, including for example, WiFi, cellular, satellite, etc.

System 100 may further include cryptogram source 160. In one embodiment, cryptogram source 160 may be a payment network association (e.g., VISA), a third party token provider (e.g., The Clearing House Payments Company, L.L.C. (TCH)), the issuer or financial institution, etc. Any suitable cryptogram source may be used as is necessary and/or desired.

In one embodiment, the cryptogram may be a token authentication verification value ("TAVV"), Dynamic Token Verification Value (DTVV), etc.

Figure 2:
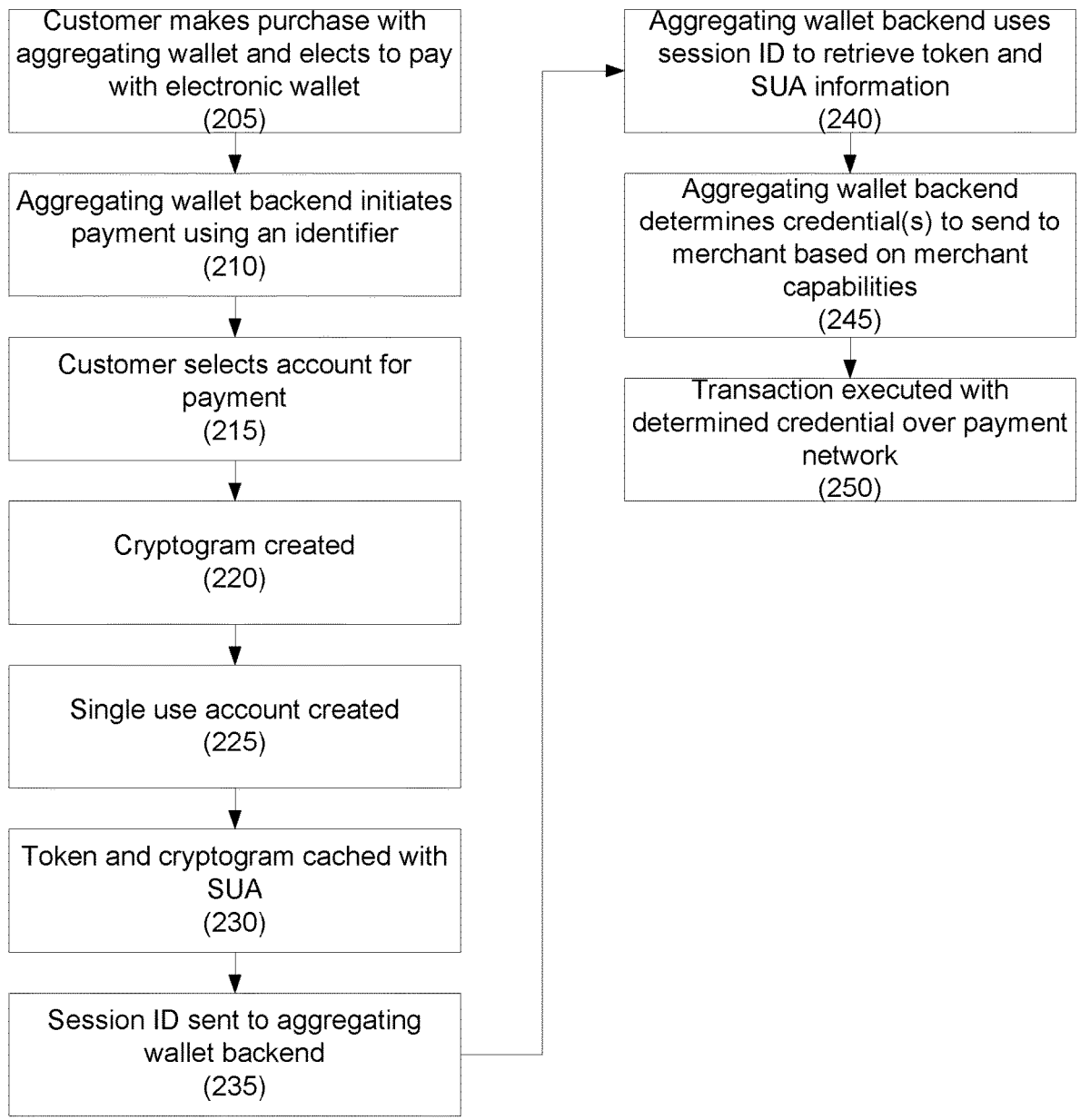
FIG. 2 depicts a method for supporting legacy and tokenized transactions according to one embodiment.

Referring to FIG. 2, a multi-credential checkout process is disclosed according to one embodiment. In general, in one embodiment, the payment app (e.g., ChasePay) may provide token information and SUA data to the wallet, and the wallet provider and/or the wallet may determine the one or more credentials to provide to the merchant.

In one embodiment, in step 205, a customer may make a purchase while using, for example, an aggregating wallet app, a browser at the aggregating wallet's website, etc., and may elect to pay with an electronic wallet hosted by a financial institution, such as ChasePay.

In one embodiment, the transaction may be with an online merchant, a brick and mortar merchant, etc.

In step 210, the aggregating wallet provider may initiate payment with the financial institution's electronic wallet using a value or identifier. For example, the aggregating wallet may use a SDK and CMAC, a browser light box, or an API gateway to initiate a customer-specific "session" with the wallet. References to the customer's accounts associated with the value may be returned to the wallet based on the identifier to allow the user to select the account to use for the transaction.

In one embodiment, the user may be authenticated to the aggregating wallet and/or the financial institution wallet. For example, when the aggregating wallet is using a payment application light box, the user may enter a Username and password for every checkout.

If the aggregating wallet uses the SDK, then the value (e.g., the CMAC) may be provided as a one-time event before a checkout. The value may then be used to authenticate for each checkout. The user only enters a username/password or fingerprint once in order to have the value issued and stored on the user's mobile electronic device If the aggregating wallet is using a API gateway, an OAUTH Refresh token may be provided as a one-time event before a checkout. The OAUTH token may then be used to authenticate for each checkout. The user only enters a username/password or fingerprint once in order to have the OAUTH token issued. The OAUTH token may be stored on the aggregating wallet backend.

The authentication with the aggregating wallet may vary based on the aggregating wallet. For example, the aggregating wallet may require a username and password, a biometric, etc.

In one embodiment, the two authentications—the aggregating wallet authentication and the financial institution wallet authentication—may be separate. For example, the aggregating wallet authentication may be considered to be a first line of defense, while the financial institution wallet authentication may be considered to be a second line of defense.

In step 215, using the financial institution's electronic wallet, the customer may identify or select the payment account to use for the transaction. In one embodiment, the API may update the aggregating wallet's app and/or with the user's payment account selection.

In step 220, a cryptogram for the account may be created. In one embodiment, the cryptogram may be created by the payment network association (e.g., VISA). In another embodiment, a third party token provider (e.g., The Clearing House Payments Company, L.L.C. (TCH)) may provide the cryptogram. In still another embodiment, the issuer or financial institution may provide the cryptogram. Any other suitable source of a cryptogram may be used as is necessary and/or desired.

In one embodiment, a dynamic CVV (dCVV) that may be based on the cryptogram may be provided with the token instead of, or in addition to, the cryptogram. For example, the dCVV may be a hash of the cryptogram. Thus, a token may be passed with an expiration date and the dCVV to the merchant for processing. When the issuer receives the transaction, the dCVV can be validated by hashing the cryptogram.

In one embodiment, the dCVV may be used with the financial institution's electronic wallet or with a third party wallet.

In step 225, a SUA may be generated. In one embodiment, the SUA may include an account number (e.g., a 16 digit account number), a CVV (e.g., CVV2), and an expiration date. In one embodiment, the SUA may be created by the association, by the financial institution, etc.

In one embodiment, the SUA may be a unique account number. In another embodiment, the SUA may be used more than once, and the CVV and/or expiration date may vary. In one embodiment, the combination of the account number, the CVV, and the expiration date may be unique.

In one embodiment, restrictions may be associated with the use of the token, cryptogram, or SUA. For example, the token, cryptogram, or SUA may have an expiration time (e.g., it expires after 1 hour), a merchant restriction (e.g., it can only be used with the merchant it is being generated for the transaction with), a geographical restriction, etc. Any other restrictions may be used as is necessary and/or desired.

In one embodiment, the financial institution and/or the payment association may maintain a mapping of the token to the SUA. In one embodiment, a third party may maintain the mapping as well.

In another embodiment, an "internal" token that may be generated and/or assigned by the financial institution may be used. For example, an internal token may be associated with an account or token, but may not be the actual account number. The internal token may be provided, along with an expiration date and a CVV (which may be the dCVV) to the merchant for processing.

In step 230, the token, cryptogram, or dCVV may be cached along with an assigned SUA to the financial institution's wallet service. For example, the consumer interactions that use the consumer's mobile device or browser may be separated from the backend interactions that are server-to-server trusted connections. Thus, the financial institution's wallet services may only transfer the most valuable data (the payment data) over a private connection, while only a low value session id may be passed to the customer's electronic device.

In step 235, the session id for the session may be sent to the aggregating wallet backend, and in step 240, the session id may be used by the aggregating wallet backend to retrieve token information, the cryptogram, the SUA, dCVV data, and/or any other information as necessary and/or desired.

In step 245, the aggregating wallet backend may determine which credential(s) to send to the merchant based on the merchant capabilities. In one embodiment, this determination may be based on the relationship between the wallet provider and the merchant, known information about the merchant's credential capabilities, machine learning, the identification of the merchant from the location of the mobile device, etc.

For example, in one embodiment, information about the merchant may be maintained in a database, and the appropriate credential(s) may be provided. In another embodiment, the wallet may transmit the credential(s) based on a prior transaction between the financial institution's electronic wallet and the merchant, the aggregating wallet backend and the merchant, a third party electronic wallet and the merchant, etc.

In one embodiment, the merchant may be identified based on the location of the mobile device (e.g., GPS), and by consulting a database of merchants in that geographical area.

In one embodiment, the aggregating wallet backend may provide all credentials (e.g., SUA, cryptogram, dCVV, etc.) to the merchant, and the merchant may select the credential that it supports. In one embodiment, the merchant point of transaction may communicate the credential that was used to the wallet.

In step 250, the transaction may be executed either with the appropriate credential over the payment network.

In another embodiment, business as usual network tokenization may be used with a trusted acquirer (e.g., an internal acquirer, a partner acquirer, etc.) to process a payment. In one embodiment, the token may be passed with an expiration date and, for example, a dCVV to the merchant. The acquirer may then contact the issuer to retrieve the full cryptogram for the token. This may include providing the dCVV to the issuer so that he issuer can validate the dCVV before providing the full cryptogram. The transaction may then proceed as a business as usual tokenized transaction.

The following documents are hereby incorporated, by reference, in their entireties: U.S. patent application Ser. No. 15/362,019; U.S. patent application Ser. No. 15/069,418; U.S. patent application Ser. No. 14/699,511, U.S. Provisional Patent Application Ser. No. 62/148,493; U.S. Provisional Patent Application Ser. No. 62/107,800; U.S. Provisional Patent Application Ser. No. 62/037,891; U.S. patent application Ser. No. 15/069,458; U.S. patent application Ser. No. 15/088,437; U.S. patent application Ser. No. 15/158,720; U.S. patent application Ser. No. 15/345,942; U.S. Provisional Patent Application Ser. No. 62/331,564, U.S. patent application Ser. No. 15/131,979, U.S. Provisional Patent Application Ser. No. 62/312,204, U.S. Provisional Patent Application Ser. No. 62/345,390; U.S. Provisional Patent Application Ser. No. 62/331,564, U.S. Provisional Patent Application Ser. No. 62/465,683; and U.S. Provisional Patent Application Ser. No. 62/469,135, the disclosures of which are hereby incorporated, by reference, in their entireties.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for selecting an electronic payment credential to communicate to a merchant, comprising:
   receiving, by an aggregating wallet backend comprising a computer processor and from an aggregating wallet application or an aggregating wallet website on a browser executed by a mobile electronic device, an indication that a transaction at point of transaction device for a merchant is to be conducted using a mobile payment application also executed on the mobile electronic device;
   initiating, by the aggregating wallet backend, payment for the transaction with the mobile payment application;
   receiving, at the aggregating wallet backend, a payment account for the transaction from the mobile payment application;
   receiving, at the aggregating wallet backend, a plurality of electronic payment credentials for the payment account comprising a token, a cryptogram and a single use account number;
   receiving, at the aggregating wallet backend, an electronic payment credential acceptance capability for the point of transaction device, wherein the point of transaction device accepts only certain electronic payment credentials;
   selecting one of the electronic payment credentials for a transaction with the merchant based on the electronic payment credential acceptance capability; and
   executing the transaction using the selected electronic payment credential.

2. The method of claim 1, wherein the single use account number is received from a financial institution associated with the payment account.

3. The method of claim 1, wherein the aggregating wallet backend receives the electronic payment credential acceptance capability for the point of transaction device based on a location of the point of transaction device.

4. The method of claim 1, wherein the aggregating wallet backend receives the electronic payment credential acceptance capability for the merchant from a database of merchant payment credential acceptance capabilities.

5. The method of claim 1, wherein the selected electronic payment credential is subject to at least one restriction.

6. The method of claim 1, further comprising:
   communicating the selected electronic payment credential to the point of transaction device for the merchant prior to executing the transaction.

7. The method of claim 6, wherein the aggregating wallet backend selects at least a subset comprising at least two of the electronic payment credentials and communicates the subset to the merchant.

8. The method of claim 1, wherein the aggregating wallet backend selects the electronic payment credential having a highest security level and is accepted by the merchant based on the electronic payment credential acceptance capability.

9. A system, comprising:
   a mobile electronic device comprising at least one computer processor and executing an aggregating wallet application and a mobile payment application; and
   an aggregating wallet backend comprising a computer application configured to: receive from the aggregating wallet backend, an indication that a transaction at point of transaction device for a merchant is to be conducted using the mobile payment application, to initiate payment for the transaction with the mobile payment application on the mobile electronic device; to receiving a payment account for the transaction from the mobile payment application; to receive a plurality of payment credentials for the payment account comprising a token, a cryptogram and a single use account number; to receive an electronic payment credential acceptance capability for the point of transaction device, wherein the point of transaction device accepts only certain electronic payment credentials; to select one of the electronic payment credentials for a transaction with the merchant based on the electronic payment credential acceptance capability; and execute the transaction using the selected electronic payment credential.

10. The system of claim 9, wherein the single use account number is received from a financial institution associated with the payment account.

11. The system of claim 9, wherein the aggregating wallet backend is further configured to receive the electronic payment credential acceptance capability for the point of transaction device based on a location of the point of transaction device.

12. The system of claim 9, wherein the aggregating wallet is further configured to receive the electronic payment credential acceptance capability for the merchant from a database of merchant payment credential acceptance capabilities.

13. The system of claim 9, wherein the selected electronic payment credential is subject to at least one restriction.

14. The system of claim 9, wherein the aggregating wallet is further configured to communicate the selected electronic payment credential to the point of transaction device for the merchant prior to executing the transaction.

15. The system of claim 14, wherein the aggregating wallet backend selects at least a subset comprising at least two of the electronic payment credentials and communicate the subset to the merchant.

16. The system of claim 9, wherein the aggregating wallet backend selects the electronic payment credential having a highest security level and is accepted by the merchant based on the electronic payment credential acceptance capability.

* * * * *